June 3, 1930. A. P. HARRISON 1,761,789
PROCESS FOR THE MANUFACTURE OF YEAST
Filed Oct. 6, 1925 2 Sheets-Sheet 2
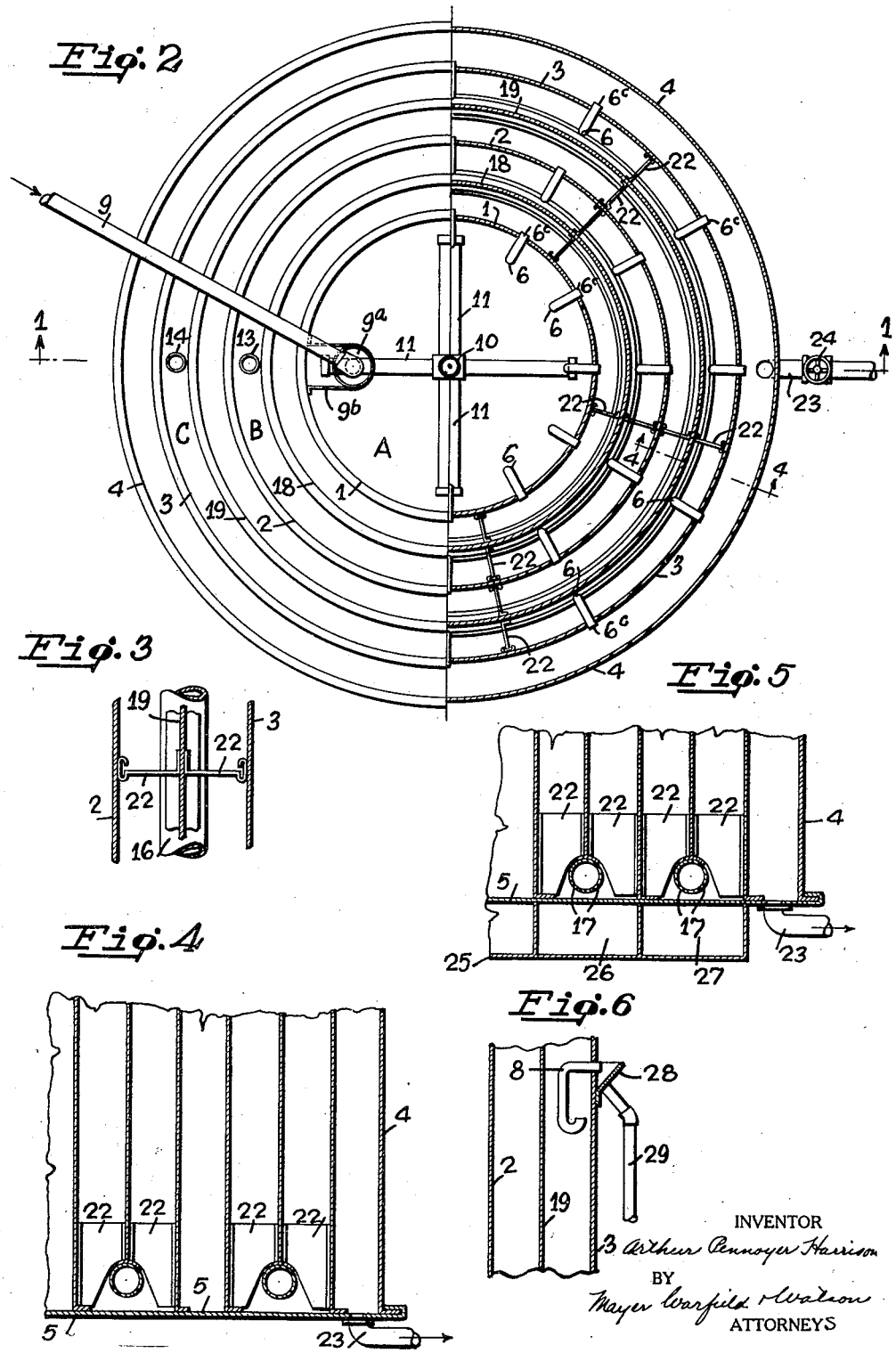

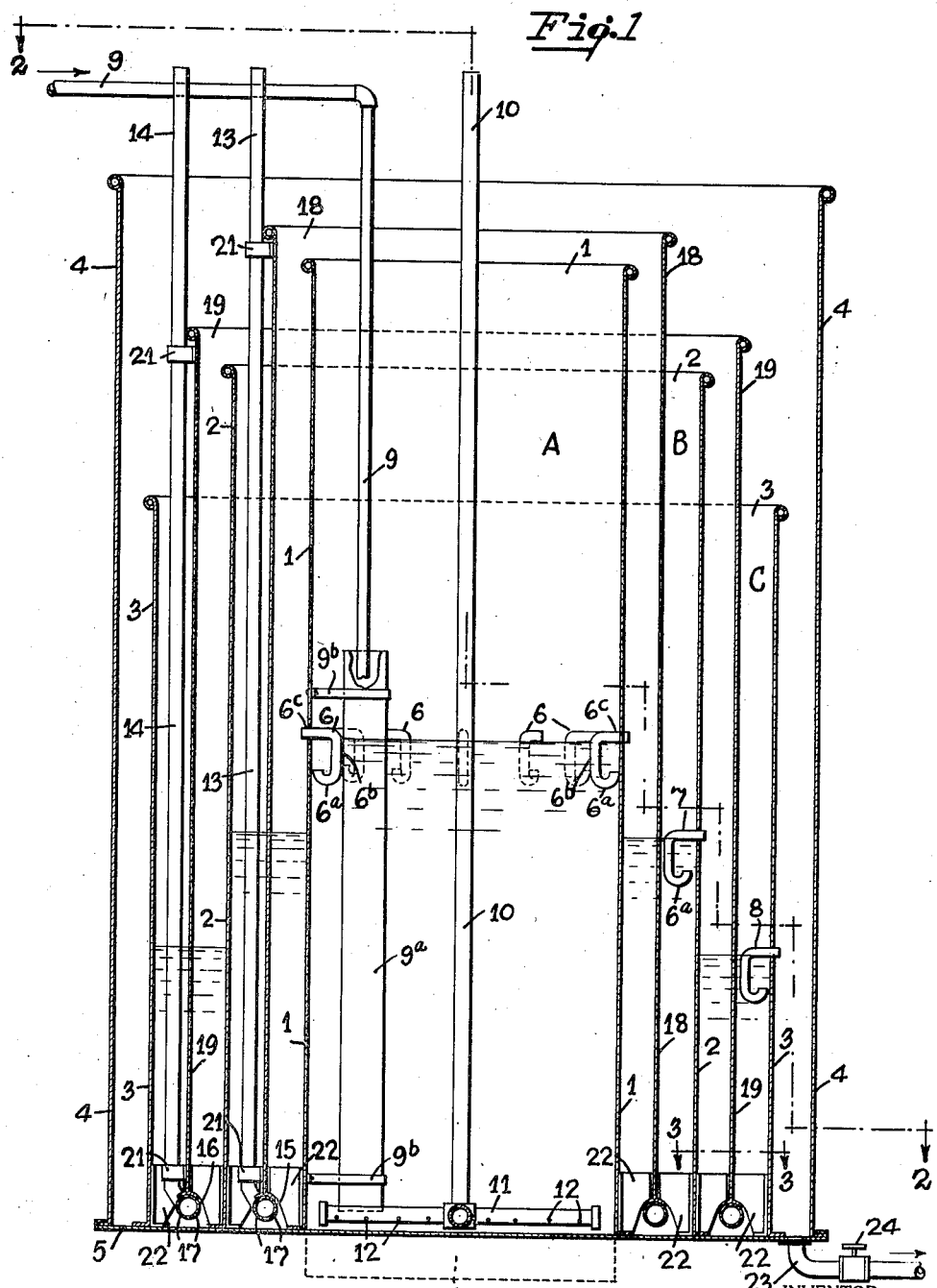

Patented June 3, 1930

1,761,789

UNITED STATES PATENT OFFICE

ARTHUR PENNOYER HARRISON, OF YONKERS, NEW YORK, ASSIGNOR, BY MESNE ASSIGNMENTS, TO STANDARD BRANDS INCORPORATED, OF DOVER, DELAWARE, A CORPORATION OF DELAWARE

PROCESS FOR THE MANUFACTURE OF YEAST

Application filed October 6, 1925. Serial No. 60,818.

This invention relates to the manufacture of yeast, especially baker's yeast, and more particularly to those processes known as "continuous-addition-continuous-withdrawal processes", in which during at least a portion of the propagating period, nutrients in solution are substantially continuously fed to the seed yeast in suspension, at a rate approximating the rate of assimilation of the nutrients, and the yeast-containing spent liquor is simultaneously substantially continuously withdrawn and separated.

An object of this invention is to provide an improved apparatus for the manufacture of yeast in an efficient, convenient and economical manner whereby the effective yeast producing capacity of the manufacturing plant is increased and the complexity of the control operations during propagation is reduced.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

Figure 1 is a vertical sectional view of one form of the apparatus taken along the dotted line 1—1 in Fig. 2, looking in the direction of the arrows;

Fig. 2 is a plan view of the device, portions thereof being shown in section, taken along the dotted line 2—2 in Fig. 1;

Fig. 3 is a plan view of a detail of the apparatus, certain portions thereof being broken away, taken along the dotted line 3—3 of Fig. 1.

Fig. 4 is a section taken along the dotted line 4—4 in Fig. 2, portions of the apparatus being broken away;

Fig. 5 is a view similar to Fig. 4, showing a modification of a portion of the device; and Fig. 6 is a sectional detail view partly broken away, showing a modification of another portion of the device.

Heretofore in the manufacture of yeast by the continuous-addition-continuous-withdrawal process, a suitable yeast nutrient solution has been prepared either from natural sources, such as by mashing and extracting the nutrients from cereal materials, or by artificially combining or preparing a nutrient solution containing the desired nutrients by the regulated and controlled admixture of suitable sugar materials such as molasses and the like, with yeast nutrient salts adapted to supply yeast-assimilable nitrogen, phosphorus and the like to the yeast during propagation. The seed or stock yeast is then suspended in a fermenter either in water or a diluted portion of the prepared nutrient solution, aeration is commenced and thereafter the reserve nutrient solution is slowly and substantally continuously added. Thereafter withdrawal of the yeast containing liquor is commenced either immediately or after a few hours when the seed yeast has increased to the desired extent and the desired amount of fermenting liquid has accumulated in the fermenter, the time of initial withdrawal being dependent upon the judgment of the operator and according to the various conditions present, particularly the amounts of liquid and stock yeast which have initially been placed in the fermenter.

Such processes have usually been carried on in an ordinary one-vat fermenter, the addition of the nutrient solution being made, either alone or with water for the purpose of dilution, through a pipe at the top of the fermenter, while the withdrawal of the yeast containing liquor to the separators has been accomplished through a pipe leading off from the bottom of the fermenter, preferably below the level of the aeration pipes. A fermenting period of from 8 to 16 or even 24 hours has ordinarily been used; aeration has been accomplished at the usual rate; the temperature has been controlled in the usual manner either by coils or surface cooling; the rate of addition of the nutrients has been regulated to approximate the rate of assimilation of the nutrients by the yeast or in such manner as approximately to keep the density of the propagating liquid constant; and the rate of withdrawal has been adjusted to approximate that of the rate of addition whereby an approximately constant volume of liquid is maintained in the fermenter, whereby a substantially uniform environment has been maintained for the yeast throughout at least a major portion of the propagating period.

Due to the conditions inherently present in these heretofore known processes, each individual yeast cell may be considered as being subjected to the conditions present in the fermenting liquid for approximately one-half of the total time, and therefore in the carrying out of such processes, particularly when using nutrient solutions of the sugar-salt type, it has been found necessary also to gradually control the chemical composition and acid reaction of the propagating liquid by the regulated addition thereto of yeast-nutrient salts and the like, and particularly those substances of an innocuous nature which tend to regulate or control the acidity of the propagating liquid. Moreover, due to the fact that the entire propagation is carried on in one fermenting space in which the propagating liquid, per se, is relatively dilute, but to which a relatively concentrated solution of nutrients is being added, (which latter is immediately intimately mixed with the fermenting liquid), obviously a certain portion of the newly added nutrient materials are constantly withdrawn with the yeast containing liquid before they have been completely assimilated. From this it will be seen that such processes are not only objectionable from the standpoint of complexity of control, but also for the reason that they are inefficient to the extent that an appreciable proportion of the available nutrient materials are not utilized.

In the present invention, among other important improvements, means have been provided whereby the yeast is subjected to the environment of any particular portion of the nutrient solution for only a relatively short time whereby the necessity for such complex control of the chemical condition of the fermenting liquid, even when using sugar-salt nutrient solutions, is substantially entirely dispensed with. Means have also been provided whereby the relative position of the point of addition of new nutrient materials from that of withdrawal of yeast-containing liquid is so remote that substantially all of the available nutrients are utilized during the passage of the nutrient solution through the apparatus. Generally speaking, therefore, the apparatus comprising the present invention may be considered as including a series of individual fermenting compartments which are provided with means whereby the flow of liquid from one compartment to the next succeeding compartment is automatically controlled whereby a substantially constant volume of liquid is maintained in each thereof; also each compartment is provided with means for aeration and is so positioned and/or equipped that an adequate control of temperature conditions may be accomplished.

In the exemplification of the apparatus shown in the drawings, the fermenting compartments, which may be of any desired number, are concentrically disposed to each other, the initial compartment being placed in the center and the liquid flowing from this compartment outwardly through the other compartments and finally to the separators. As shown in Fig. 1, the apparatus includes three fermenting compartments formed by concentrically disposed walls 1, 2 and 3 which are preferably circular in form and each of which is secured with a liquid-tight joint to a bottom wall 5. At a suitable height, the compartment A is provided with a series of outlets 6 which extend through the wall and are circumferentially disposed thereon whereby a constant level of the liquid therein and a uniform flow of liquid therefrom is obtained. Each of the outlets 6 is formed with an inverted U-shaped portion 6$^a$ which prevents the entry of uprising gas into the outlet, a vertical portion 6$^b$, which extends below the foam level and well into the liquid thereby insuring a transfer of liquid instead of a transfer of foam containing a disproportionate share of yeast and oil, if such be used as a foam reducer and an upper horizontal portion 6$^c$ which determines the liquid level and extends through the wall 1. As indicative of an outlet structure having these functions, such outlets will be hereinafter referred to as "liquid-seal-gas-trap outlets".

At somewhat lower levels respectively, walls 2 and 3 are likewise equipped with a series of liquid-seal-gas-trap outlets 7 and 8. These outlets may be arranged relatively at any desired heights and as a matter of convenience have been shown to be arranged at such heights that the volumes of liquid in the respective compartments are substantially equal.

The compartment A is also provided with a liquid feed pipe 9 through which the nutrients in solution are fed into the compartment, and which preferably feeds into a suitable guide such as the cylinder 9$^a$ which is attached to the wall 1 by suitable traps 9$^b$, and which for the reason that it extends above the liquid level and terminates above the bottom of the compartment, insures an efficient feeding of liquid to the bottom thereof. This compartment is also equipped with an aeration pipe 10 which is provided with a suitable aeration head 11, containing suitable perforations 12. In a similar manner, the compartments B and C are respectively equipped with aeration pipes 13 and 14 which likewise are respectively provided with aeration heads 15 and 16 preferably circular in form and containing suitable perforations 17.

Within compartments B and C and intermediate the walls 1 and 2 and the walls 2 and 3 respectively, are positioned baffle walls 18 and 19 which are similar in contour to walls 1, 2 and 3 and are equipped at the bottom with saddle shaped flanges 20, by means of which they are seated on the circular aeration heads 15 and 16 respectively. To further insure the proper positioning of these various parts of the apparatus, the aeration pipes 13 and 14 may be secured to the baffle walls 18 and 19 by suitable straps 21, and the baffle walls may be maintained in position between the respective compartment walls by means of spacing elements 22. A principal object of the baffle walls 18 and 19 is to prevent the cascading of the liquid from the outlets of one compartment immediately across the surface of the liquid and out the outlets of the succeeding compartment. The use of the baffle walls insures that the liquid from the outlets of one compartment must pass downwardly between the outside of the wall of the said compartment and the baffle, thence under the baffle and up the other side thereof and through outlets of the wall of the succeeding compartment. In order to facilitate this operation and to allow of a free flow of the liquid through the path indicated, the circular aeration heads 15 and 16 are preferably somewhat raised from the bottom 5, and the spacing members 22 are notched at their lower portions. It has also been found that the proper circulation and thorough admixture of the liquids is facilitated by positioning the perforations 17 of the aeration heads 15 and 16 toward the lower portion thereof as shown in the drawing so that the air jets are directed downwardly.

It will thus be seen that the ultimate course of passage of any given unit of liquid will be from the liquid intake pipe 9 at the bottom of compartment A, thence upwardly through the outlets 6, into compartment B in the space between the baffle 18 and the outside of the wall 1 thence downwardly underneath the baffle 18 and the aeration head 15, thence upwardly between the baffle 18 and the wall 2 and through the outlets 7 into compartment C thence downwardly between the outside of the wall 2 and the baffle 19, underneath the baffle 19 and the aeration head 16, and thence upwardly between the baffle 19 and the wall 3 and out through the outlets 8. This movement of liquid is of course, relatively slow so that any given unit thereof is subjected to the action of the yeast which is in the fermenting liquid for a sufficient length of time to insure efficient utilization of the nutrients.

The stocking of the apparatus with seed yeast may be accomplished in any desired manner, as for example, by placing all of the seed yeast within compartment A or by placing varying percentages thereof also in compartments B and C. The compartment A may be filled to the level of the outlets 6 with a dilute nutrient solution, an even further diluted solution may be placed in compartment B and compartment C may, if desired, either be left empty or filled with water. Aeration of the three compartments is then commenced and either immediately or after a short period of time, the addition of nutrients in solution may be commenced through the feed pipe 9. As soon as the liquid in compartment C has reached the level of the outlets 8, the yeast-containing spent liquid flows outwardly through the outlets 8 and down the outside of wall 3 into the compartment D which is formed between the wall 3 and the wall 4 from which it is immediately or at intervals withdrawn to the separators through the outlet pipe 23 which opens through the bottom 5 and which may have a suitable valve 24.

In order that the temperature of the fermenting liquid may be properly controlled, the central compartment A may be provided with a suitable temperature control jacket 25 as shown in dotted lines in Fig. 1 through which is adapted to be circulated either hot or cold water. Since the device is concentrically arranged and the liquid is flowing outwardly continuously from the central compartment to the outer compartments, the control of the temperature of the liquid in the central compartment will generally suffice to also control that of the outer compartments B and C. If desired, however, each of the compartments A, B and C may be provided with a jacket similar to 25 such as, for example, the jackets 26 and 27 respectively, as shown in Fig. 5. Obviously, the apparatus may, if desired, be modified by merely altering the respective heights of the outlets and transposing the inlet and outlet pipes; the direction of the flow may also, if desired, be reversed.

Also, if desired, the compartment D, formed by the wall 4, together with the outlet pipe 23 may be dispensed with by the use of a modified construction such as that shown in Fig. 6 wherein a trough 28 is placed around the wall 3 which is immediately below the outlets 8, the trough 28 being provided with a pipe 29 leading to the separators in a manner similar to that of the pipe 23.

In the operation of the apparatus for the manufacture of yeast, it has been found to be desirable, for example, to place within the central compartment A, a nutrient solution having a density of about 1.3° Balling, filling the compartment B with a nutrient solution of approximately one-half of this concentration and at least partially filling the compartment C with water. The amount of seed yeast which may be used in the various compartments, based on the nutrient materials in the liquid in each compartment at the beginning of the operation, may vary considerably, as for example, from 50% to 70% in A, 60% to 80% in B and 70% to 100% in C. It will be understood, of course, that when the percentage of seed yeast is calculated on the basis of total nutrients which may be passed through the apparatus at one seeding, the figures therefor fall proportionately. Addition of the nutrients in solution may be commenced either immediately or at the end of the first or second hours and the rate of addition and withdrawal may be so regulated that the density of the fermenting liquid in compartment A remains approximately constant, as for example, from 1.0° to 1.5° Balling, whereas the density of the fermenting liquid in compartments B and C after the operation has become settled will be several tenths of a degree lower, as for example, approximately 0.7° Balling, thus indicating that a thorough assimilation of available nutrients is being accomplished. Moreover, if desired, additional small amounts of seed yeast may be added in any compartment from time to time to maintain the stability of the process and, in order to prevent infection etc., a microscopic check has also been found to be useful.

When using a reserve nutrient liquid of a density of from 10° to 15° Balling, it will be found that when using the amounts of seed yeast specified, the rate of addition and withdrawal may be such that any given unit of newly added nutrient liquid will pass entirely through the apparatus in the separators in a relatively short period, as for example, from 1½ to 3 hours. It will therefore, be seen that since the yeast is subjected to the conditions of fermentation for such a short time generally any involved control of the chemical condition of the fermenting liquid is unnecessary, although of course, such may be carried on if desired, without departing from the purpose of the present invention.

Moreover, due to the arrangement of the various parts of the apparatus, it will be seen that the action of the apparatus after the addition of the reserve nutrient liquid is commenced is substantially automatic and need be controlled primarily only from the standpoint of density and temperature determinations, and although the concentric arrangement of the fermenting vats is preferred because of the large saving in factory space, etc., it is obvious that, if desired, the fermenting compartments might be separated and arranged in series position without departing from the spirit of the present invention.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim—

1. A continuous-addition-continuous-withdrawal apparatus for manufacturing yeast, including a series of fermenting compartments connected by a plurality of liquid seal-gas trap outlets, each outlet being located at a fixed height in its given compartment.

2. A continuous-addition-continuous-withdrawal apparatus for manufacturing yeast, including a series of concentrically disposed fermenting compartments connected by a plurality of liquid seal-gas trap outlets, each outlet being located at a fixed height in its given compartment, and means for aerating each compartment.

3. A continuous-addition-continuous-withdrawal apparatus for manufacturing yeast, including a series of concentrically disposed fermenting compartments, connected by a plurality of liquid seal-gas trap outlets, each outlet being located at a fixed height in its given compartment, means for aerating each compartment, and means for controlling the temperature of at least one of said compartments 4. A continuous-addition-continuous-withdrawal apparatus for manufacturing yeast, including a series of concentrically disposed fermenting compartments, liquid-seal-gas-trap outlets connecting said compartments, means for aerating each compartment and means for controlling the temperature of at least one of said compartments.

5. A continuous-addition-continuous-withdrawal apparatus for manufacturing yeast, including a series of concentrically disposed fermenting compartments, liquid-seal-gas-trap outlets connecting said compartments, means for controlling the temperature of at least one of said compartments, baffle dividing means concentrically disposed in each of said compartments and means for aerating each compartment on each side of said baffle.

6. A continuous-addition-continuous-withdrawal apparatus for manufacturing yeast, including a series of concentrically disposed fermenting compartments, liquid-seal-gas-trap outlets connecting said compartments, means for controlling the temperature of at least one of said compartments, baffle dividing means concentrically disposed in, and spaced from, the bottom of each of said fermenting compartments, and means for aerating each compartment on each side of said baffle.

7. A continuous-addition-continuous-withdrawal apparatus for manufacturing yeast, including a series of concentrically disposed fermenting compartments, liquid-seal-gas-trap outlets connecting said compartments, means for controlling the temperature of at least one of said compartments, baffle dividing means concentrically disposed in, and spaced from, the bottom of each of said fermenting compartments, means for aerating each compartment on each side of said baffles, means for feeding liquid into the bottom of the first of said compartments and an outlet compartment surrounding the last of said fermenting compartments, said outlet compartment having a liquid withdrawal pipe connected therewith.

8. A continuous-addition-continuous-withdrawal apparatus for manufacturing yeast, including a series of concentrically disposed fermenting compartments, liquid-seal-gas-trap liquid outlets in the side wall of each of said compartments and connecting contiguous compartments of said compartments, means for controlling the temperature of at least one of said compartments, baffle dividing means concentrically disposed in, and spaced from, the bottom of each of said fermenting compartments, means for aerating each compartment on each side of said baffles, means for feeding liquid into the bottom of the first of said compartments and a withdrawal trough surrounding the last of said fermenting compartments and being disposed substantially immediately below said liquid outlets in the side wall of said last of said fermenting compartment, said withdrawal trough having a liquid withdrawal pipe connected therewith.

9. An apparatus for manufacturing yeast by a continuous-addition-continuous-withdrawal process, said apparatus including a fermenting tank, said tank being provided with a plurality of dividing walls and baffles forming a series of communicating fermenting compartments whereby nutrient solution may be progressively passed therethrough, means for aerating each of said compartments, and means associated with the first and last of said compartments respectively for introducing and withdrawing a nutrient solution therefrom.

10. In a continuous withdrawal process of manufacturing yeast with aeration, passing the yeast propagating liquid through an apparatus which includes a plurality of compartments arranged in series and so feeding yeast nutrients to at least one of the compartments, so aerating the liquid in each compartment, and so rating passage of liquid through the compartments that the density of the propagating liquid in the first of said compartments is maintained substantially constant and the density of the propagating liquid in the last two of the series of compartments is maintained both substantially equal and substantially constant and is somewhat lower than the density in the first mentioned compartment.

11. In a continuous withdrawal process of manufacturing yeast with aeration, passing the yeast propagating liquid through an apparatus which includes a plurality of compartments arranged in series and so feeding yeast nutrients to at least one of the compartments, so aerating the liquid in each compartment, and so rating passage of liquid through the compartments that the density of the propagating liquid in the first of the series of compartments is maintained at approximately 1.3° Balling, the density of the propagating liquid in the last two of the series of compartments, is maintained at approximately 0.7° Balling, and the yeast-containing spent liquid is withdrawn from the last of said compartments at a rate substantially equal to that of the introduction of yeast nutrients in solution.

12. In a continuous withdrawal process of manufacturing yeast with aeration, passing the yeast propagating liquid through an apparatus which includes a plurality of compartments arranged in series and so feeding yeast nutrients to at least one of the compartments, so aerating the liquid in each compartment, and so rating passage of liquid through the compartments that the density of the propagating liquid in the first of said compartments is maintained substantially constant and the density of the propagating liquid in the last two of the series of compartments is maintained both substantially equal and substantially constant and is somewhat lower than the density in the first mentioned compartment, and removing the yeast-containing spent liquid from the last of the series of fermenting compartments at a rate substantially equal to the rate of addition of the yeast nutrients in solution, and separating the yeast from said spent liquid.

In testimony whereof I affix my signature.

ARTHUR PENNOYER HARRISON.